Nov. 5, 1946.  A. T. GREGORY  2,410,411
ENGINE VALVE CONTROL MECHANISM
Filed May 19, 1942  2 Sheets-Sheet 1

INVENTOR
ALFRED T. GREGORY
BY Hoquet Geary + Campbell
his ATTORNEYS

Nov. 5, 1946.    A. T. GREGORY    2,410,411
ENGINE VALVE CONTROL MECHANISM
Filed May 19, 1942    2 Sheets-Sheet 2
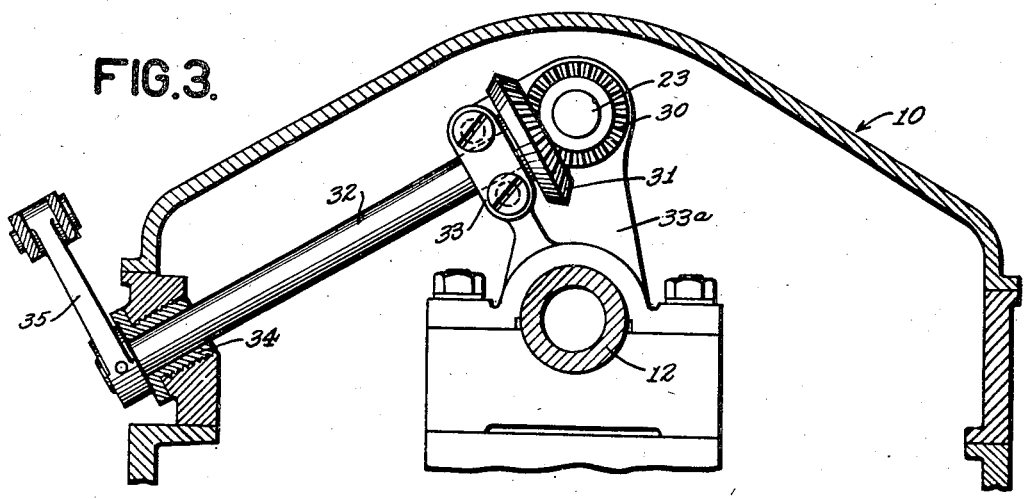
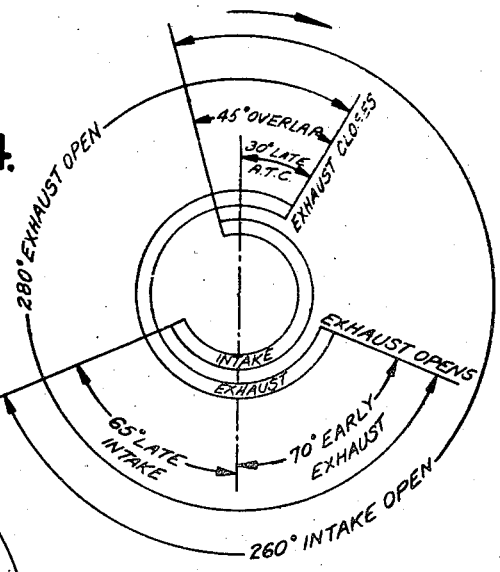
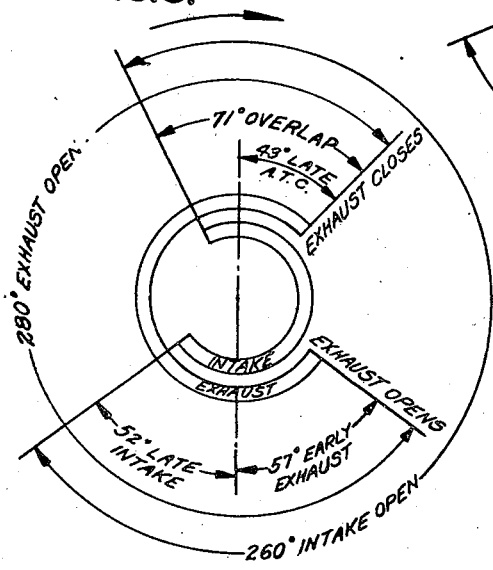
INVENTOR
ALFRED T. GREGORY
BY
Hognest Keay & Campbell
his ATTORNEYS Patented Nov. 5, 1946

2,410,411

UNITED STATES PATENT OFFICE 2,410,411

ENGINE VALVE CONTROL MECHANISM

Alfred T. Gregory, Massapequa, N. Y., assignor to Fairchild Engine and Airplane Corporation, Farmingdale, N. Y., a corporation of Maryland Application May 19, 1942, Serial No. 443,572

2 Claims. (Cl. 123—90)

This invention relates to engine valve timing mechanisms, and relates particularly to mechanisms for changing the time of operation of the intake and/or exhaust valves of an internal combustion engine, in accordance with the load requirements of the engine.

The relative times of intake and exhaust valve operation of an engine are usually fixed and heretofore it has been so difficult to adjust timing during operation of the engine that it has not been done, except in a very few instances and then the mechanism used was unreliable, complicated and cumbersome to a degree rendering its value questionable. Nevertheless, the advantages of such adjustments are many and, if readily and simply accomplished, the resulting increased power output at high speeds, economy of operation at low speeds, and improved idling characteristics justify its use. This is particularly the case with aeronautical engines, which operate under widely varying speed, load and atmospheric conditions.

The advantages pointed out above are obtained by the variable valve timing mechanism of this invention, which is arranged for adjustment of the opening and closing times of the intake and/or exhaust valves to vary the degree of overlap of their operating cycles. This adjustment may be made in accordance with varying operating speeds of the engine in order for example, to increase the power output during takeoff and climb of an airplane, to economize in the use of fuel at low speeds, and to obtain smoother idling. Improved scavenging without increase in cooling requirements is obtained with the larger valve overlaps at high power output, particularly at high engine speeds.

In a preferred embodiment of the invention, cam actuated rockers that open poppet type intake and/or exhaust valves are pivotally supported on shiftable members extending along the engine. Eccentrics are provided for moving the shiftable elements so as to move the corresponding rockers relative to the cams and the valves in order to vary the relative positions of the rockers and the cams. By shifting the rockers, the corresponding valves are actuated earlier or later with respect to the cycles of operation of the engine. The connection between each rocker and its corresponding valve is arranged to accommodate this relative movement without readjustment of the valve, and the movement of the rocker thus can result in earlier or later opening and closing of the valve, as the case may be, without appreciable change in the valve clearance or lift during operation of the motor.

In order to obtain these results, in accordance with the invention, the axis of pivotal movement of the rocker arm, in its various adjusted positions, will lie substantially in a plane which is disposed substantially perpendicular to the axis of the valve stem. The effective lengths of the lever arms of the rocker are not changed, nor is the axis of the rocker displaced appreciably in the direction of movement of the valve. Accordingly, the valve clearance and lift will remain substantially constant in all of the adjusted positions of the rocker arm, but the timing of the valve will be different in each adjusted position of the rocker.

The adjustment of the rocker pivot to effect the aforementioned timing adjustment of the valves may be effected either automatically or manually. For example, the adjustment of the rocker pivot may be accomplished by means of a manually actuated lever or handle or by power means which is responsive to changes in the speed of the engine.

For a better understanding of the present invention, reference may be had to the accompanying drawings in which:

Figure 3 is a view in end elevation of a mechanism for actuating the rocker arm adjusting device;

Figure 4 is a diagrammatic showing illustrating the time relationship between the operation of an exhaust and intake valve during normal operation; and Figure 5 is a diagrammatic showing of the relative cycles of operation of an intake and exhaust valve adjusted for increased speed and improved scavenging of the exhaust gases.

Figure 1:
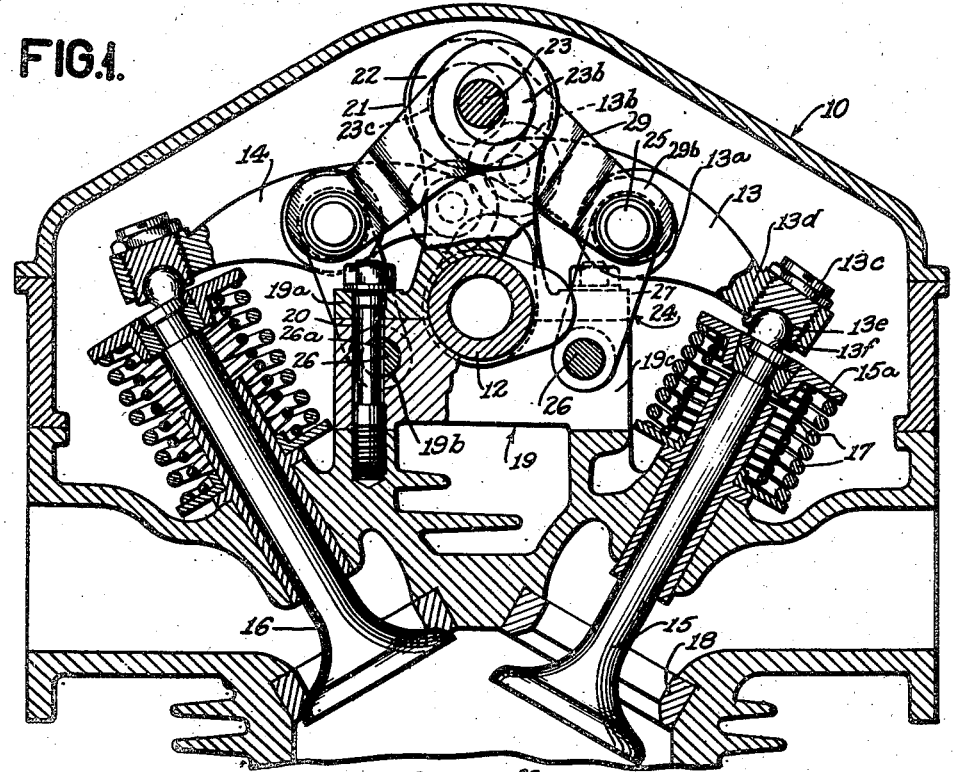
Fig. 1 is a view in elevation and partly in vertical section of a typical form of rocker arm construction embodying the invention and a portion of the cylinder head for an internal combustion engine.
Figure 1:
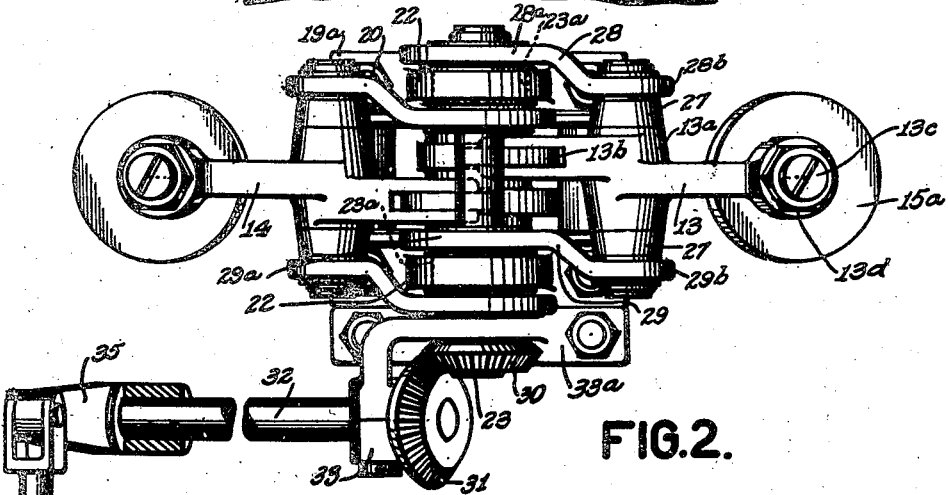
Figure 2:
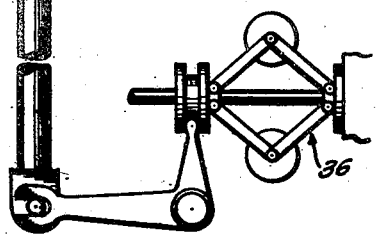
Figure 2 is a plan view of the rocker adjusting mechanism of Figure 1 and additionally showing an automatic mechanism for effecting adjustment thereof.

The form of the invention illustrated in Figures 1 to 3 of the drawings may be applied to any type of internal combustion engine having poppet type valves therein and is illustrated as applied to an internal combustion engine of the valve-in-head type. As illustrated in Figure 1, the device includes a cylinder head 10 which is suitably secured to the cylinder of an internal combustion engine. The cylinder head carries the cam shaft 12 for actuating the rocker arms 13 and 14 which in turn are adapted to reciprocate the intake valves 15 and the exhaust valves 16 of the engine. The valves 15 and 16 may be of any conventional type and, as illustrated, are inclined with respect to the axis of the cylinder. The rockers 13 and 14 are similar and only rocker 13 will be described. The rocker has a central bearing portion 13a, an antifriction roller 13b at one end bearing against the cam shaft 12 and an adjusting screw 13c at the opposite end 13d. As illustrated, the adjusting screw 13c may be provided with a semi-spherical cavity 13e in which is mounted a semi-spherical ball member 13f which engages the end of the valve stem.

The valves 15 and 16 may be of conventional construction or, as illustrated, may have an enlarged disc-like spring retainer 15a rotatably mounted thereon against which the valve springs 17 engage to normally seat the valve in its seat 18.

The cam shaft 12 is suitably mounted in a series of split bearings 19 which are secured to the cylinder head 10 by bolts 20 at opposite edges thereof.

The upper bearing section 19a is provided with extensions 21 at its opposite ends, each having a bearing ring 22 therein for receiving an eccentric or cam shaft 23. The shaft 23, as best shown in Figure 2, includes spaced apart bearing portions 23a which are received in the bearing rings 22. On opposite sides of the bearing portions 23a are circular eccentrics 23b and 23c which have their centers disposed equidistantly from the center of the bearing portions 23a. The angular spacing of the centers of the eccentrics may be varied as required to effect proper timing.

The eccentrics 23b and 23c are used to adjust the position of the rockers 13 and 14 with relation to the cam shaft 12. This adjustment is accomplished through the use of suitable shackles 24 supporting the rockers 13 and 14.

As shown in Figure 1, the shackles 24 consist of a pair of pivot pins 25 and 26 which are connected by the links 27, 27. The pivot pin 26 is mounted in a suitable bore 19b in the lower bearing portion 19c of the cam shaft bearing 19. As shown in Figure 1, the pin 26 is provided with notches 26a adjacent each end through which the bolts 20 pass to lock the pin 26 in position.

The bearing portion 13a of the rocker 13 is pivotally supported on the pivot pin 25 between the links 27, 27.

Mounted upon the eccentrics 23c, as shown in Figure 2, are the connecting rods 28 and 29 which have the eccentric straps 28a and 29a at one end and bearings 28b and 29b at their opposite ends for receiving the ends of the pin 25. Upon rotation of the eccentric shaft 23, the shackles 24 are rocked about the pivot pin 26 to displace the rocker 13 endwise. This displacement of the rocker 13 is relatively small and, therefore, there is little actual displacement of the end 13d of the rocker in the direction of movement of the valve 15. Moreover, the inclination of the shackle 24 is such that the bodily upward movement of the rocker 13 as the shackle 24 swings inwardly is compensated for largely by the upward movement of the inner end of the rocker as the roller 13b rides up the cam shaft 12 toward top center of the cam shaft and the resulting downward movement of the end 13d. In typical constructions, the displacement of the rocker end 13d in the direction of valve movement does not exceed .012", that is, the valve clearance does not increase and the lift does not decrease by more than .012" throughout the angle of adjustment for changing the timing, which is inappreciable and has little effect upon the operation of the valve.

The eccentric shaft 23 may extend along the entire bank of cylinders and in this form is provided with a single mechanism for simultaneously adjusting all of the valves, as shown in Figures 2 and 3. One form of the adjusting mechanism includes a bevel gear 30 fixed to the end of the shaft 23 adjacent one end of the cylinder head 10 and outside the end bearing support 21. Another bevel gear 31 meshes with the gear 30 and is supported on a shaft 32. The shaft 32 is mounted in a suitable bearing 33 on the support 33a and a bearing 34 in the cylinder head 10 is provided with a lever 35 on its outer end. This lever may be connected to a suitable lever or handle on or adjacent to the instrument panel of an airplane, for example, or may be connected to a speed responsive device, such as the governor 36, as shown in Fig. 2, to regulate the position of the shaft 23 and to control the timing of the valves 13 and 14.

A specific example of the manner in which my valve timing mechanism operates is disclosed in the diagrams forming Figures 4 and 5. Figure 4 illustrates the normal timing of the intake and exhaust valves in a typical internal combustion engine during the exhaust and intake strokes. As illustrated, the exhaust opens in this timing arrangement at about 70° before bottom dead center position of the piston on the combustion stroke and remains open through the exhaust stroke to about 30° past top dead center position on the intake stroke. The intake valve opens about 15° before top dead center on the exhaust stroke and closes about 65° past bottom dead center on the compression stroke. Thus, as shown in Figure 4, there is an overlap of about 45° in the two cycles, namely, exhaust and intake when both intake and exhaust valves are open, to promote the scavenging of the combustion gases from the cylinder and to initiate the feeding of a fresh charge into the cylinder.

At normal speeds and during idling, such a degree of overlap is entirely satisfactory for scavenging substantially all of the burned gases from the cylinder and for drawing in a fresh charge for later combustion. However, under high speed operation such as, for example, when the engine is operated at full throttle, an inadequate portion of the burner gases can be removed from the cylinder and a smaller fresh charge drawn into the cylinder. Therefore, it would be desirable from the standpoint of greater power output to permit the exhaust valve to remain open for a longer time during the intake stroke, so that the inertia of the gases will tend to carry them out of the cylinder and the incoming charge of air or of fuel and air will aid in flushing the exhaust gases from the cylinder. In accordance with the present invention, the timing of opening and closing of the valves may be varied by shifting the rocker arms of the intake and exhaust valves relatively to the cam shaft as described above so that the exhaust valve opens later than in normal operation or nearer the end of the power stroke and closes later in the intake stroke, as shown in Figure 5.

Similarly, the intake valve may be opened earlier in the exhaust stroke of the piston and closed earlier in the compression stroke. With this arrangement the incoming charge will tend to flush or scavenge the burned combustion gases from the cylinder and the later closing of the exhaust valve will permit these gases to flow out more completely. The result is an increase in the volumetric efficiency of the engine. Thus, a larger fuel charge can be burned in the cylinder, thereby generating more power when power is required. On the other hand, by adjusting the timing of the valves to the cycle shown in Figure 4, or to an intermediate position, or to one with still less overlap, greater fuel economy with adequate power output for cruising conditions can be obtained.

The ability to be adjusted into various positions without disturbing the operation of the valves results from the fact that endwise shifting movement of the rocker arms is substantially in a plane at right angles to the axis of the valve stems. Inasmuch as any displacement of the rocker arms in the direction of motion of the valve stems is kept at a minimum by the use of shackles of relatively long radius, the displacement of the valves from the valve seats in all adjusted positions of the rocker arms is inappreciable and within the tolerances permitted in adjusting the valve clearances.

It will be apparent that the adjustment of the valve timing mechanism will be dependent upon factors of power output and fuel economy and thus when high power output is required without regard to the amount of fuel to be used, the degree of overlap of the valves may be increased and when the power output is secondary to economy of operation, the amount of overlap may be decreased. It will be further apparent that the adjustment of the timing system will be dependent largely upon the desired speed of operation of the motor. Therefore, the adjustment of the device may most suitably be accomplished through the use of a speed-responsive device such as, for example, a governor.

It will be understood further that the device is susceptible to considerable modification in its details and, therefore, the form of the invention described above should be considered as illustrative, only, and not as limiting the scope of the following claims.

I claim:

1. A mechanism for varying the timing of valves for internal combustion engines, comprising a cylinder head, a shackle pivotally connected to said head having a pivot pin at its free end, a substantially straight rocker pivotally mounted at about its mid-portion on said pivot pin, a cam shaft on said cylinder head engageable with one end of said rocker for rocking said rocker, a valve engageable with the other end of and actuated by said rocker, and an eccentric for rocking said shackle to displace said rocker endwise and displace said one end angularly around the axis of said cam shaft.

2. A mechanism for varying the timing of valves for internal combustion engines, comprising a substantially straight rocker having opposite ends, a cam shaft rotatable in one direction, only, and engageable with one end of said rocker for actuating said rocker, a valve stem engaged by the other end of and actuated by said rocker, means pivotally connected to said rocker intermediate its ends and supporting said rocker for endwise shifting movement toward and away from said valve stem substantially in a plane at a right angle to the axis of said stem, to displace said one end angularly around the axis of said cam shaft, and means for shifting said rocker to vary the time of opening of said valve.

ALFRED T. GREGORY.